United States Patent
Liang

(10) Patent No.: US 12,201,902 B2
(45) Date of Patent: Jan. 21, 2025

(54) ANTI-RECONNAISSANCE FEATURE IN A MULTI-PLAYER VIDEO GAME

(71) Applicant: Tencent Technology (Shenzhen) Company Limited, Guangdong (CN)

(72) Inventor: Chao Liang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 469 days.

(21) Appl. No.: 17/675,419

(22) Filed: Feb. 18, 2022

(65) Prior Publication Data

US 2022/0168638 A1 Jun. 2, 2022

Related U.S. Application Data

(63) Continuation of application No. PCT/CN2020/128246, filed on Nov. 12, 2020.

(30) Foreign Application Priority Data

Jan. 20, 2020 (CN) .......................... 202010065183.0

(51) Int. Cl.
*A63F 13/52* (2014.01)
*A63F 13/25* (2014.01)
(Continued)

(52) U.S. Cl.
CPC .............. *A63F 13/52* (2014.09); *A63F 13/25* (2014.09); *G06F 3/0484* (2013.01); *G06F 3/1423* (2013.01)

(58) Field of Classification Search
CPC ........ A63F 13/52; A63F 13/25; A63F 13/335; A63F 13/69; A63F 13/837; G06F 13/335
See application file for complete search history.

(56) References Cited

U.S. PATENT DOCUMENTS

| | | | |
|---|---|---|---|
| 2011/0319153 A1* | 12/2011 | Gomez | ............... G07F 17/3262 463/20 |
| 2016/0323544 A1 | 11/2016 | Wang et al. | |
| 2019/0255437 A1 | 8/2019 | Wang et al. | |

FOREIGN PATENT DOCUMENTS

| | | |
|---|---|---|
| CN | 103595715 A | 2/2014 |
| CN | 103813022 A | 5/2014 |

(Continued)

OTHER PUBLICATIONS

Call of Duty, Modern Warfare 2, video game published by Activision in Nov. 2009 and as evidenced by Wiki article. (Year: 2009).*

(Continued)

*Primary Examiner* — James S. McClellan

(74) *Attorney, Agent, or Firm* — ArentFox Schiff LLP

(57) ABSTRACT

A screen switching method includes obtaining, by a first client, a switching instruction, the switching instruction being generated by a second client, the first client and the second client being different clients, and the switching instruction instructing screen switching, and obtaining, by the first client, a first screen according to the switching instruction, the first screen being a preset screen. The method further includes switching, by the first client, a second screen displayed on a display interface of the first client, to the first screen according to the switching instruction, and the first screen and the second screen being different screens.

17 Claims, 12 Drawing Sheets

(51) Int. Cl.
*G06F 3/0484* (2022.01)
*G06F 3/14* (2006.01)

(56) References Cited

FOREIGN PATENT DOCUMENTS

| | | |
|---|---|---|
| CN | 104780336 A | 7/2015 |
| CN | 110198478 A | 9/2019 |
| CN | 111228803 A | 6/2020 |
| WO | 2015067207 A1 | 5/2015 |

OTHER PUBLICATIONS

Gamefaqs.com topic discussion with relevant comments from 2010, available online (https://gamefaqs.gamespot.com/boards/951943-call-of-duty-modern-warfare-2/52243144) (Year: 2010).*

Supplementary European Search Report issued Nov. 22, 2022 in Application No. 20914922.8, pp. 1-7.
International Search Report Written Opinion issued Feb. 10, 2021 in International Application No. PCT/CN2020/128246 citing documents AA and AO-AS therein, 11 pgs.
Japanese Office Action issued Oct. 2, 2023 in Application No. 2022-520114, pp. 1-8.
[COD Mobile] Beginner course! ? What is [Scorestreak]? Youtube[online][video], Oct. 4, 2019, https://www.youtube.com/watch?v=C42t8wdPn4M—especially, Refer to animation time [03:31]-[04:40], pp. 1-6.
Japanese Office Action issued Apr. 17, 2023 in Application No. 2022-520114, pp. 1-12.
Counter-Uav, Call of Duty Wiki | Fandom[online], Nov. 25, 2019, https://callofduty.fandom.com/wiki/Counter-UAV?oldid=2489610, pp. 1-7.
Black Ops 2—UAV vs Counter UAV [Call of Duty BO2 Killstreak Scores treak Difference], Youtube[online][video], Nov. 30, 2012, https://www.youtube.com/watch?v=RCwyUiERaQk, pp. 1-3.

* cited by examiner

ANTI-RECONNAISSANCE FEATURE IN A MULTI-PLAYER VIDEO GAME

RELATED APPLICATIONS

This application is a continuation of International Application No. PCT/CN2020/128246, filed on Nov. 12, 2020, which claims priority to Chinese Patent Application No. 202010065183.0, entitled "SCREEN SWITCHING METHOD AND APPARATUS, DEVICE, AND MEDIUM" filed on Jan. 20, 2020. The entire disclosures of the prior applications are hereby incorporated by reference in their entirety.

FIELD OF THE TECHNOLOGY

This application relates to the field of electronic technologies, including screen switching.

BACKGROUND OF THE DISCLOSURE

During an online game, such as a multiplayer online battle arena (MOBA) game or a real-time strategy (RTS) game, multiple users are connected to a server through respective clients to play the game with multiple players being online at the same time. As shown in FIG. 1, during a game, in order to enable each player to see related information of the game, there is a target window 101 in a display interface of a client used by each player, for displaying the information related to the game, for example, a mini-map and location coordinate information of game units.

A game mechanism has been introduced to the related art to increase information displayable on the target window 101. For example, by triggering a first operation, a first-camp player can see coordinate information of an opponent (a second-camp player) in the mini-map on the target window 101, to gain a game advantage. Correspondingly, this causes the second-camp player to be at a disadvantage in the game. However, there is no corresponding technical solution in the related art to allow the second-camp player to make up for such a game disadvantage, degrading game quality.

SUMMARY

In view of this, to resolve the foregoing problem, this application provides the following technical solution.

In an embodiment, a screen switching method includes obtaining, by a first client, a switching instruction, the switching instruction being generated by a second client, the first client and the second client being different clients, and the switching instruction instructing screen switching, and obtaining, by the first client, a first screen according to the switching instruction, the first screen being a preset screen. The method further includes switching, by the first client, a second screen displayed on a display interface of the first client, to the first screen according to the switching instruction, and the first screen and the second screen being different screens.

In an embodiment, a screen switching method includes obtaining, by a server, a switching instruction, the switching instruction instructing screen switching, and identifying, by the server, a first client according to the switching instruction, the first client and a second client being different clients, and the second client being a client that generated the switching instruction. The method also includes transmitting, by the server, the switching instruction to the first client, so that the first client switches, according to the switching instruction, a second screen displayed in a display interface of the first client to a first screen, and the first screen and the second screen being different screens.

In an embodiment, a screen switching method includes responding, by a second client, to a trigger operation of a user on a control, the control being displayed in a display screen of the second client, and the control controlling screen switching on a display interface of a first client, and obtaining, by the second client, a switching instruction according to the trigger operation, the switching instruction instructing screen switching. The method also includes transmitting, by the second client, the switching instruction to a server, so that the server instructs, according to the switching instruction, the first client to switch to a first screen a second screen displayed on the display interface of the first client, the first screen and the second screen being different screens, and the first client and the second client being different clients.

BRIEF DESCRIPTION OF THE DRAWINGS

To describe the technical solutions in the embodiments of this application more clearly, the following briefly describes the accompanying drawings describing the embodiments. The accompanying drawings in the following descriptions show merely the embodiments of this application, and a person of ordinary skill in the art may still derive other accompanying drawings from the accompanying drawings.

DESCRIPTION OF EMBODIMENTS

The technical solutions in the embodiments of this application are described in the following with reference to the accompanying drawings in the embodiments of this application. The described embodiments are merely some rather than all of the embodiments of this application. All other embodiments obtained by a person of ordinary skill in the art based on the embodiments of this application shall fall within the protection scope of this application.

The terms such as "first", "second", "third", and "fourth" (if any) in the specification and claims of this application and in the accompanying drawings are used for distinguishing between similar objects and not necessarily used for describing any particular order or sequence. It is to be understood that the data used in such a way is interchangeable in proper cases, so that the embodiments described herein can be implemented in other orders than the order illustrated or described herein. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

Figure 1:
FIG. 1 is a diagram of an application scenario of a screen switching method according to an embodiment of this application.

During an online game, such as a MOBA game or an RTS game, multiple users are connected to a server through respective clients to play the game with multiple players being online at the same time. As shown in FIG. 1, during a game, in order to enable each player to learn of related information of the game, there is a target window 101 in a display interface of a client used by each player, for displaying the information related to the game, for example, a mini-map and location coordinate information of game units.

A game mechanism has been introduced to increase information displayable in the target window 101. For example, by triggering a first operation, a first-camp player can see coordinate information of an opponent (a second-camp player) in the mini-map in the target window 101, to gain a game advantage. Correspondingly, in order to ensure the fairness of the game mechanism, the second-camp player needs to have a second operation that can counter the first operation, to reduce information displayed in the target window 101 of the first-camp player, to make up for a game disadvantage. However, there is no corresponding technical solution currently that can achieve the foregoing second operation to enable the second-camp player to make up for the game disadvantage, degrading game quality.

In order to resolve the foregoing problem, an embodiment of this application provides a screen switching method that can change a display screen of a window in a first client through a switching instruction generated by a second client, allowing one client to remotely control switching of a display screen of a window in another client, so that the second-camp player can change display content of the target window 101 in a terminal of the first-camp player, thereby achieving the second operation.

For ease of understanding, a screen switching method provided in the embodiments of this application is described in detail below with reference to the accompanying drawings.

Figure 2:
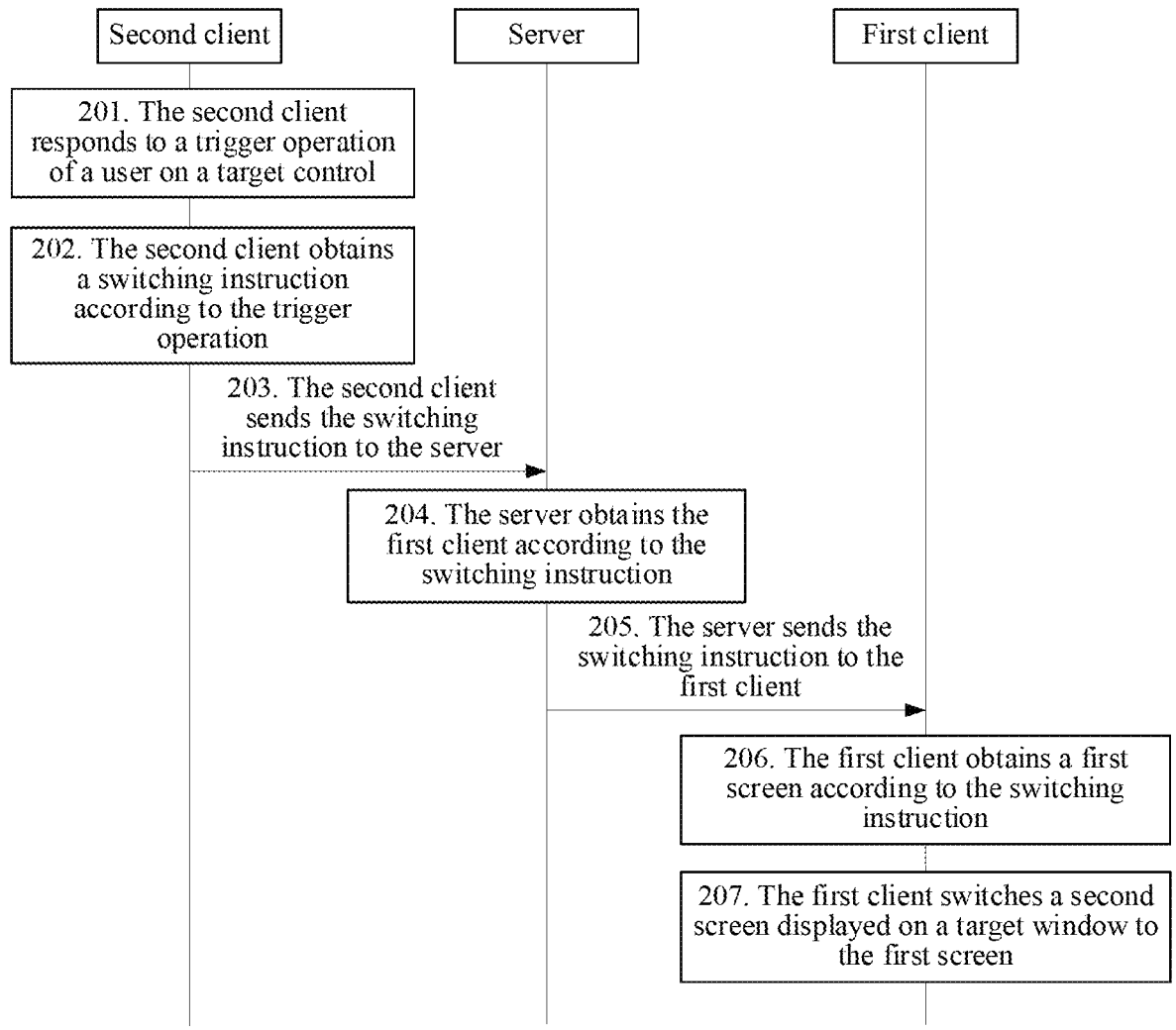
FIG. 2 is a schematic diagram of an embodiment of a screen switching method according to an embodiment of this application.

Referring to FIG. 2, as shown in FIG. 2, an embodiment of the screen switching method provided in the embodiments of this application includes the following steps.

In step 201, a second client responds to a trigger operation of a user on a target control.

In this embodiment, the target control is a control displayed in a display screen of the second client. The target control includes a triggered state and non-triggered state. For example, in a smart terminal operated through a touchscreen such as a mobile phone or a tablet, the target control may be a button that is triggered by a touch operation of a user; or in a personal computer (PC), the target control may be a control button that is triggered by mouse click or keyboard input. In this solution, the target control is used for controlling a target window of a first client to perform an operation of switching a display screen. When needing to switch the display screen of the target window in the first client, the user operating the second client triggers the target control through the trigger operation.

In step 202, the second client obtains a switching instruction according to the trigger operation.

In this embodiment, after the target control in the second client is triggered, the second client obtains, according to the trigger operation, a switching instruction corresponding to the trigger operation. The correspondence between the switching instruction and the trigger operation is pre-stored in the second client. After receiving the trigger operation, the second client can obtain the switching instruction according to the trigger operation. The switching instruction is used for instructing to switch a second screen displayed on the target window in the first client to a first screen.

In step 203, the second client sends the switching instruction to a server.

In this embodiment, using an online game scenario as an example, because the first client and the second client are each connected to the server to play the same game, when needing to intervene in display content of the first client, the second client needs to send a request to the server, and the server performs scheduling.

In step 204, the server obtains a first client according to the switching instruction. In an embodiment, the server identifies the first client in step 204.

In this embodiment, after receiving the switching instruction sent by the second client, the server needs to determine a first client for executing the switching instruction. The first client may be determined according to a certain preset rule. For example, it is assumed that a game character controlled by the second client is a first-camp player. In this case, a game character controlled by the first client is a second-camp player, a first camp and a second camp are camps countering each other. In this case, a specific implementation in which the server obtains a first client according to the switching instruction is: determining, by the server, a first camp to which the second client sending the switching instruction belongs; determining, by the server, a second camp countering the first camp; and determining, by the server according to the second camp, that a client corresponding to a game character of the second camp is the first client.

Through the foregoing steps, the server obtains the first client according to the switching instruction.

A quantity of first clients is not limited in this embodiment. There may be one or more first clients.

In step 205, the server sends the switching instruction to the first client.

In this embodiment, after determining the first client that needs to receive the switching instruction, the server sends the switching instruction to the first client, to perform a subsequent screen switching operation on the first client.

In step 206, the first client obtains a first screen according to the switching instruction.

In this embodiment, upon receipt of the switching instruction, the first client can learn that a second screen being displayed on the target window needs to be switched to the first screen according to the switching instruction. Therefore, in this case, the first screen needs to be obtained according to the switching instruction. The first screen is a preset screen stored in the first client. The first client can obtain the first screen through the switching instruction according to a preset relationship between the switching instruction and the first screen.

In step 207, the first client switches a second screen displayed on a target window to the first screen.

In this embodiment, the first client has obtained the locally pre-stored first screen according to the switching instruction. In this case, the second screen displayed on the target window is replaced with the first screen, and the first screen and the second screen are different screens, thereby achieving screen switching.

The screen switching method provided in this embodiment of this application includes: obtaining, by a first client, a switching instruction sent by a server; obtaining, by the first client, a first screen according to the switching instruction, the first screen being a preset screen; and switching, by the first client, a second screen displayed on a target window to the first screen, the target window being a display window in a display interface of the first client, and the first screen and a second screen being different screens. The second client obtains a switching instruction generated according to a trigger operation of a user, and a server sends the switching instruction to the first client, so that the first client can switch a display screen in a target window according to the switching instruction, allowing one client to control switching of a display screen on a target window of another client.

The screen switching method provided in this embodiment of this application can be used not only in a game scenario, but also in other scenarios requiring screen switching, such as in live video broadcasting, in which two online streamers are broadcasting online through respective terminals. Either online streamer can switch a display screen of a target window in a live broadcast screen of the other online streamer by using the method provided in this application. Alternatively, in social networking software, one user switches, through a second client, a specific social homepage screen displayed on a first client of another user.

For ease of understanding, the screen switching method provided in this embodiment of this application is described mainly by using a game scenario as an example in this embodiment of this application. However, this does not constitute any limitation on a usage scenario of the screen switching method provided in this embodiment of this application.

In the field of gaming, the method provided in this embodiment of this application is applicable to various different fields, such as MOBA games, RTS games, or first-person shooter (FPS) games in the field of gaming. This is not limited in this embodiment of this application.

The screen switching method provided in this embodiment of this application is further described below in conjunction with a game scenario.

During a game, the screen switching method provided in this embodiment of this application enables a player of a second client to change, through triggering of a target control, display content on a target window of a first client. For example, the display content on the target window may be game map information and game unit coordinate location information, so that a player of the first client can easily grasp a game status. The screen switching operation can shield the information in the target window, thereby reducing the grasp of the game status by the player corresponding to the first client, allowing the player of the second client to have a certain game advantage, and improving game quality.

Therefore, in consideration of balancing of the game mechanism, the player of the second client cannot be allowed to frequently trigger the target control. In order to resolve this problem, the method disclosed in the embodiments of this application provides the following solution, which is described in detail below with reference to the accompanying drawings for ease of understanding.

Figure 3:
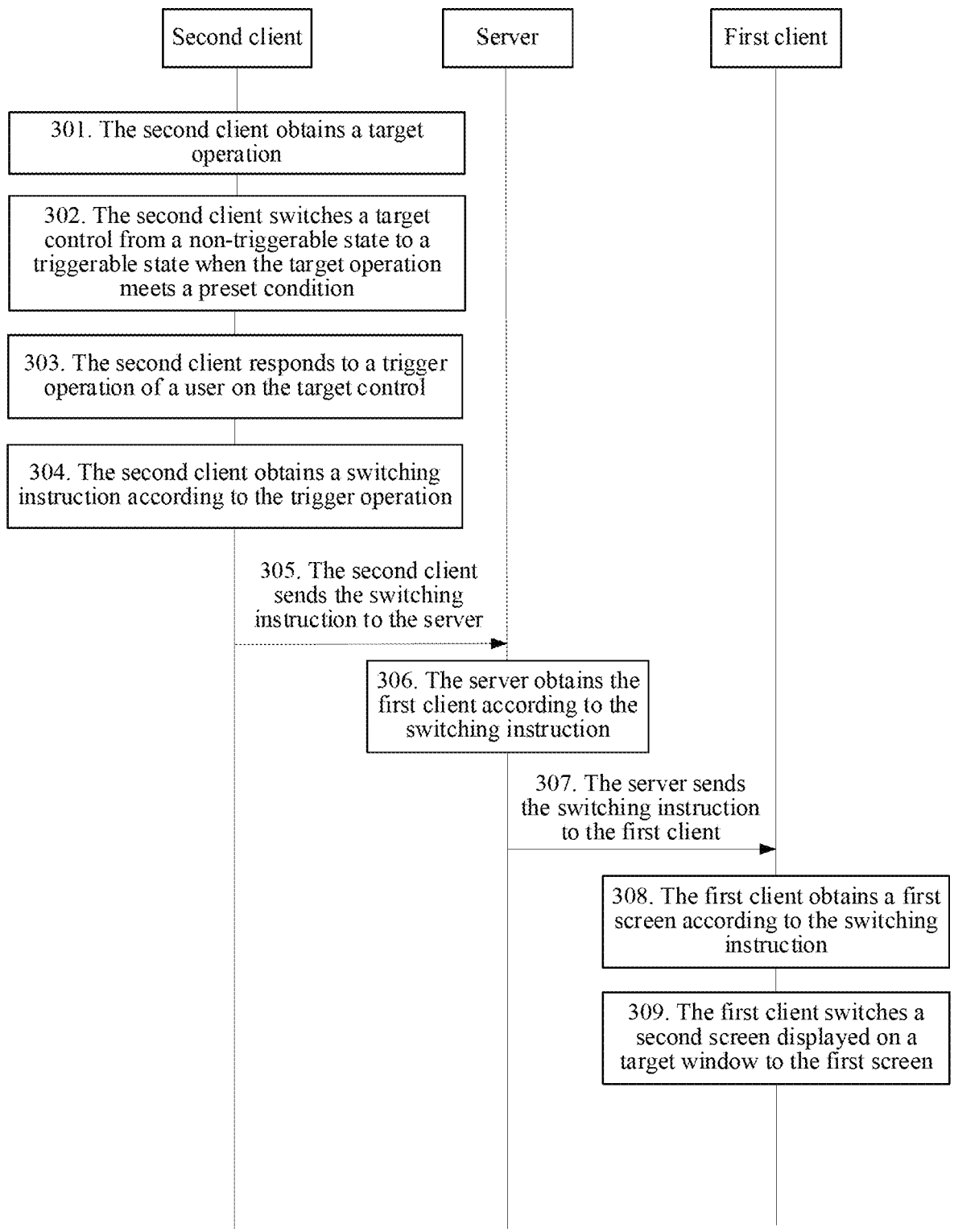
FIG. 3 is a schematic diagram of another embodiment of a screen switching method according to an embodiment of this application.

Referring to FIG. 3, an embodiment of the screen switching method provided in the embodiments of this application includes the following steps.

In step 301, a second client obtains a target operation.

In this embodiment, the target operation is an operation input by a user into the second client. For example, the target operation may be a condition, such as quantity of target units killed by a player, and the target unit may be an opponent or a non-player character (NPC) in the game. In a possible implementation, the target operation may alternatively be a game time. This is not limited in this embodiment of this application.

In step 302, the second client switches a target control from a non-triggerable state to a triggerable state when the target operation meets a preset condition.

In this embodiment, the target control is switched from the non-triggerable state to the triggerable state when the target operation meets the preset condition. Before the target operation meets the preset condition, the target control is in the non-triggerable state, which limits a condition for triggering the target control in the second client, and can encourage a user of the second client to more actively promote the target operation to meet the preset condition, thereby increasing the fun of the game and making the game mechanism more balanced.

For example, the target operation is to kill an opponent, and the preset condition is a quantity of opponents killed. For example, it is assumed that the preset condition is that the quantity of opponents killed reaches 5. In this case, in the second client, the target control is in the non-triggerable state when the quantity of opponents killed by the user is less than 5. When the quantity of opponents killed by the user is greater than or equal to 5, the target control is in the triggerable state. When the quantity of opponents killed by the user reaches 5, after the target control is triggered to perform a screen switching operation, the target control changes to the non-triggerable state again until the user kills five opponents again, and the target control switches to the triggerable state again, and so on, until the game ends.

Alternatively, the target operation is a time, and the preset condition is a time period. For example, it is assumed that the preset condition is 120 seconds. In this case, the user of the second client cannot trigger the target control within 120 seconds after the game starts. When the game time reaches 120 seconds, the target control switches from the non-triggerable state to the triggerable state. After the user triggers, at a first moment, the target control to perform the screen switching operation, the target control changes to the non-triggerable state again for 120 seconds from the moment, until the end of the 120 seconds, and so on, until the game ends.

For subsequent steps 303 to 309, refer to the foregoing steps 201 to 207. Details are not described herein again.

In this embodiment, the triggerable state of the target control is limited by setting the preset condition for the target operation, so that the target control becomes triggerable when the target operation meets the preset condition, thereby limiting a condition for using the screen switching method in the game and balancing the game mechanism.

The screen switching method provided in this embodiment of this application may serve as an optional skill for selection by the user during the game. That is, in the beginning of the game, the game provides a bank of skills for the user to select skills that can be carried in each round of game. The user selects some skills from the bank of skills as skills for a current round of the game. For example, the bank of skills in the game provides 30 skills, each skill provides one game operation effect, and each round of the game allows a player to carry only three skills. In this case, when each round of the game starts, the player needs to select three skills from the 30 skills to start the current round of the game. The screen switching method provided in this embodiment of this application belongs to one of the 30 skills, and needs to be selected by the user before it can appear in an interface of the game as a skill carried by the player.

For ease of understanding, this case is described in detail below with reference to the accompanying drawings.

Figure 4:
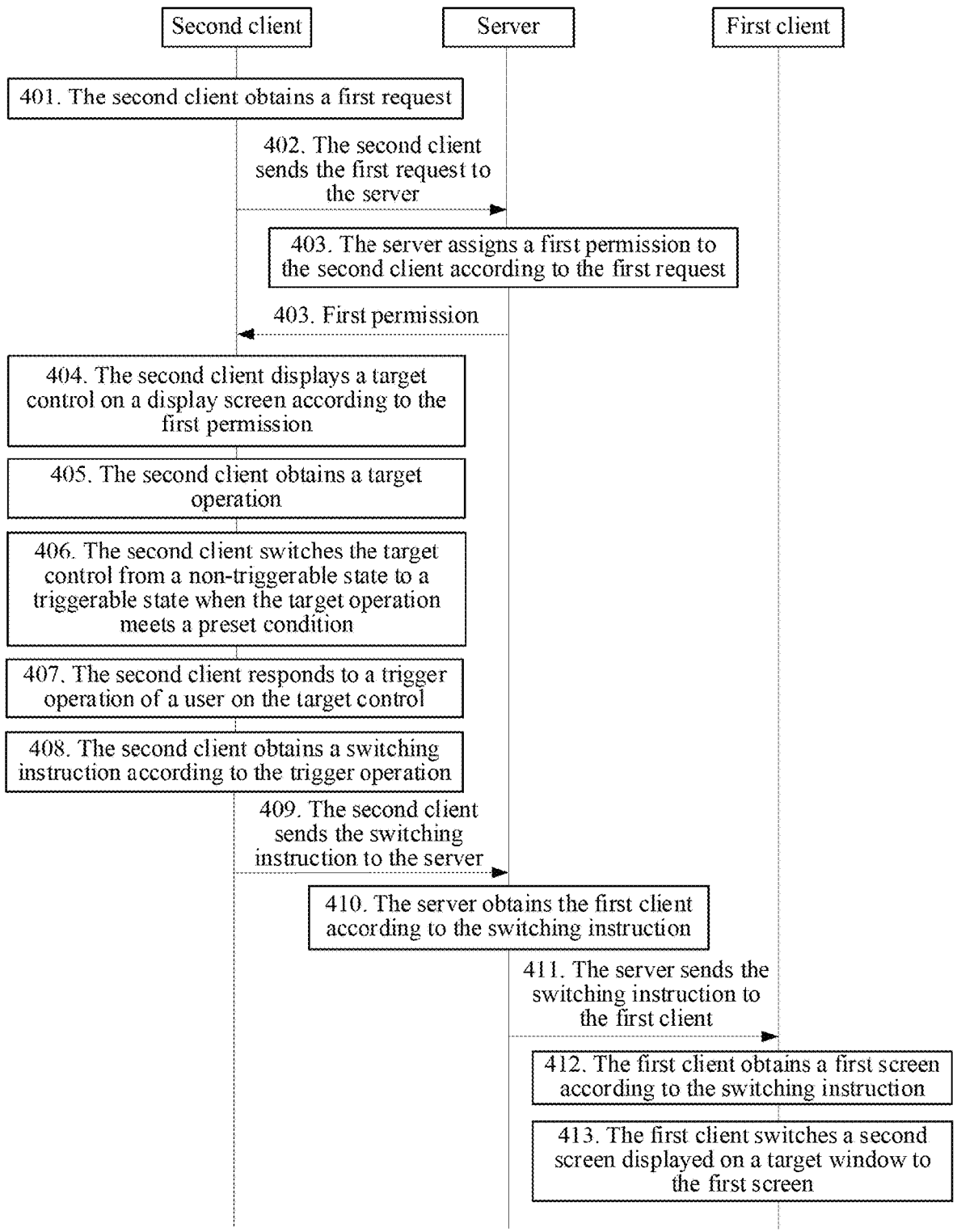
FIG. 4 is a schematic diagram of another embodiment of a screen switching method according to an embodiment of this application.

Referring to FIG. 4, a screen switching method provided in the embodiments of this application includes the following steps.

In step 401, a second client obtains a first request.

In this embodiment, the first request is used for requesting to display a target control on the second client. For example, obtaining a first request may include the following steps.

First, the second client presents a control list, the control list including a plurality of controls, and the plurality of controls including the target control.

Next, the second client responds to a selection operation of a user, the selection operation being initiated by the user and used for selecting, from the control list, a control that needs to be displayed on a display screen.

Then, the second client generates a first request according to the selection operation.

In this embodiment, for example, the user selects the target control through the selection operation. In this case, the first request is used for requesting to display the target control during the game.

In step 402, the second client sends the first request to a server.

In this embodiment, because the game is an online game, and game logic runs in the server, the first request needs to be sent to the server to be confirmed by the server.

In step 403, the server assigns a first permission to the second client according to the first request.

In this embodiment, the first permission is used for allowing the second client to display the target control in a display interface. In the game, the display interface may be a game interface.

In step 404, the second client displays a target control on a display screen according to the first permission.

In this embodiment, the second client displays the target control on the display screen according to the first permission, so that after the user enters the game, the target control appears in a skill bar of the user. Accordingly, the screen switching method provided in this embodiment of this application can be performed.

For subsequent steps 405 to 413, refer to the foregoing steps 301 to 309. Details are not described herein again.

In this embodiment, the interaction between the second client and the server enables the screen switching method provided in this application to become an optional skill during the game, thereby enriching the game. In a possible implementation, in the foregoing steps, alternatively, the second client may locally generate the first permission directly according to the first request, then add the target control to the display interface, and finally report a result of the operation to the server, thereby omitting the intermediate interaction step of permission assignment. A specific solution to be selected from the two solutions as an implementation is not limited in this embodiment of this application.

Based on the above, the application of the screen switching method provided in this embodiment of this application to a game can enable one party to gain an advantage of shielding game information of the other party, but in order to ensure game balancing, such an advantage cannot always exist, otherwise the game fairness for the other party is affected. Therefore, the display time of the first screen needs to have a time limit. In view of this, the embodiments of this application provide the following technical solutions.

For ease of understanding, this case is described in detail below with reference to the accompanying drawings.

Figure 5:
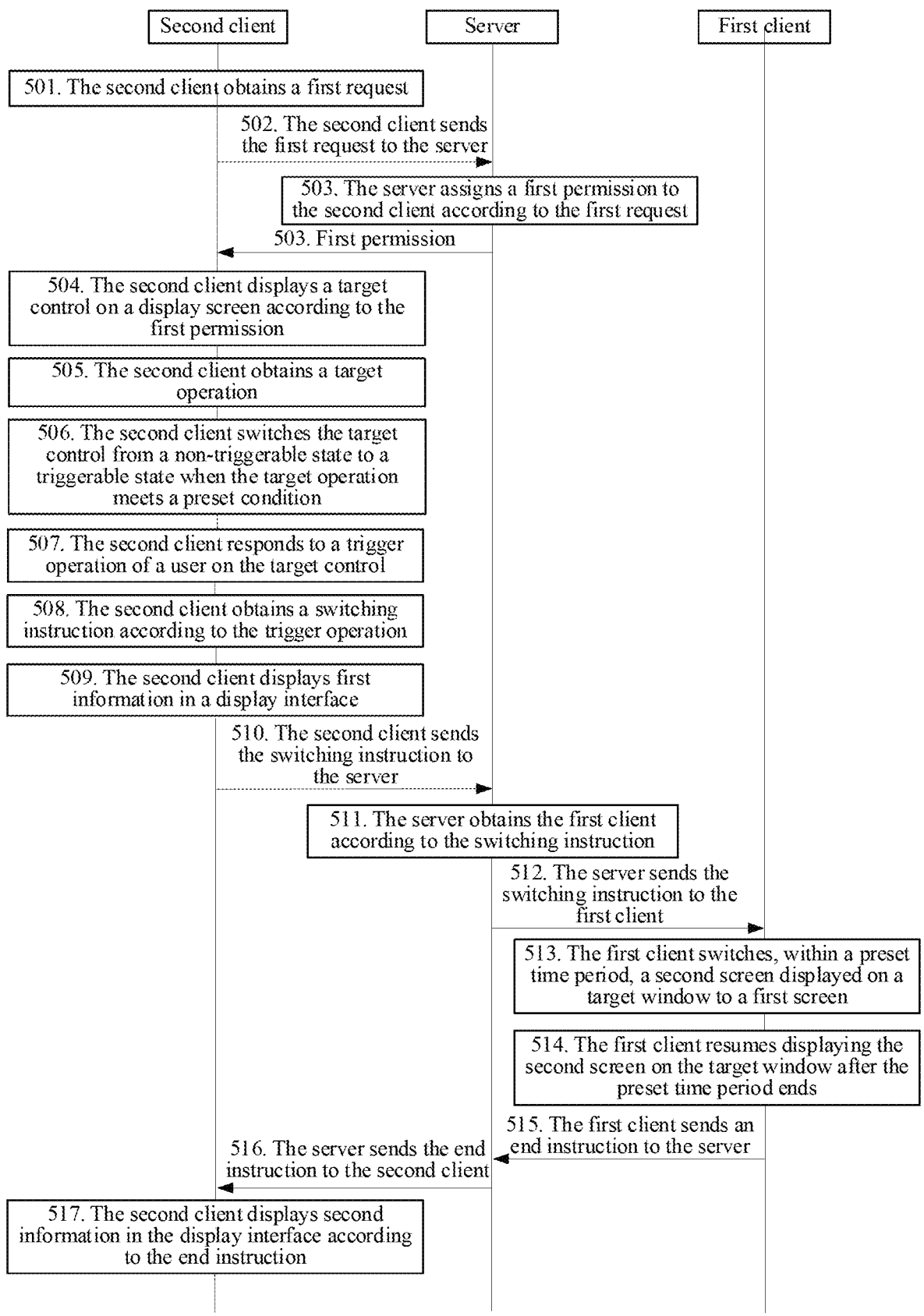
FIG. 5 is a schematic diagram of another embodiment of a screen switching method according to an embodiment of this application.

Referring to FIG. 5, a screen switching method provided in an embodiment of this application includes the following steps.

For steps 501 to 508, refer to the foregoing steps 401 to 408. Details are not described herein again.

In step 509, the second client displays first information in a display interface.

In this embodiment, the second client sends a switching instruction to a server after performing step 509. At this time, the second client can indicate that a target window in a first client immediately displays a first screen. In this case, the first information needs to be displayed in the display interface. The first information is a piece of prompt information, allowing a user to know that a screen displayed on the target window of the first client is switched to the first screen.

For steps 510 to 512, refer to the foregoing steps 409 to 411. Details are not described herein again.

In step 513, the first client switches, within a preset time period, a second screen displayed on a target window to a first screen.

In this embodiment, the preset time period is a time period of preset duration, which is preset in the first client by the game developer during game development. After obtaining the first screen according to a switching instruction, the first client can display the first screen on the target window according to the preset time period.

In step 514, the first client resumes displaying the second screen on the target window after the preset time period ends.

In this embodiment, ater the preset time period ends, the first client resumes displaying the second screen on the target window. The second screen is used for displaying running information of the first client, and the first screen is used for shielding the running information of the first client. For example, the second screen is used for displaying map information (that is, running information) of the game, and the first screen is used for displaying snowy screen information without any content. In this case, within the preset time period, the displayed snowy screen information shields a user of the first client from obtaining the game information, causing a game disadvantage. After the preset time period ends, the game disadvantage stops, thereby controlling a playing length of the first screen and achieving game fairness.

In step 515, the first client sends an end instruction to the server.

In this embodiment, the first client notifies the server, through the end instruction, that the display of the first screen has ended. That is, a screen currently displayed on the target window in the first client has been switched back to the second screen.

In step 516, the server sends the end instruction to the second client.

In this embodiment, ater receiving the end instruction, the server forwards the end instruction to the second client, so that the second client learns of a current screen displayed in the target window in the first client.

In step 517, the second client displays second information in the display interface according to the end instruction.

In this embodiment, the second information is used for indicating that the screen displayed on the target window of the first client is the second screen. That is, the second information is used for notifying the user that content currently displayed on the target window of the first client has been switched from the first screen back to the second screen.

In this embodiment, the second client learns of a display status of a current screen on the target window of the first client through sending and receiving of instructions, and then displays, on the second client, a notification message including second information of the screen displayed on the target window in the first client, so that the user can know the current status of screen switching.

Based on the above, the screen switching method provided in this embodiment of this application is applicable to a game scenario. A MOBA shooting game is used as an example below to describe in detail an implementation of the screen switching method provided in this embodiment of this application in a specific usage environment.

For ease of understanding, this case is described in detail below with reference to the accompanying drawings.

Figure 6:
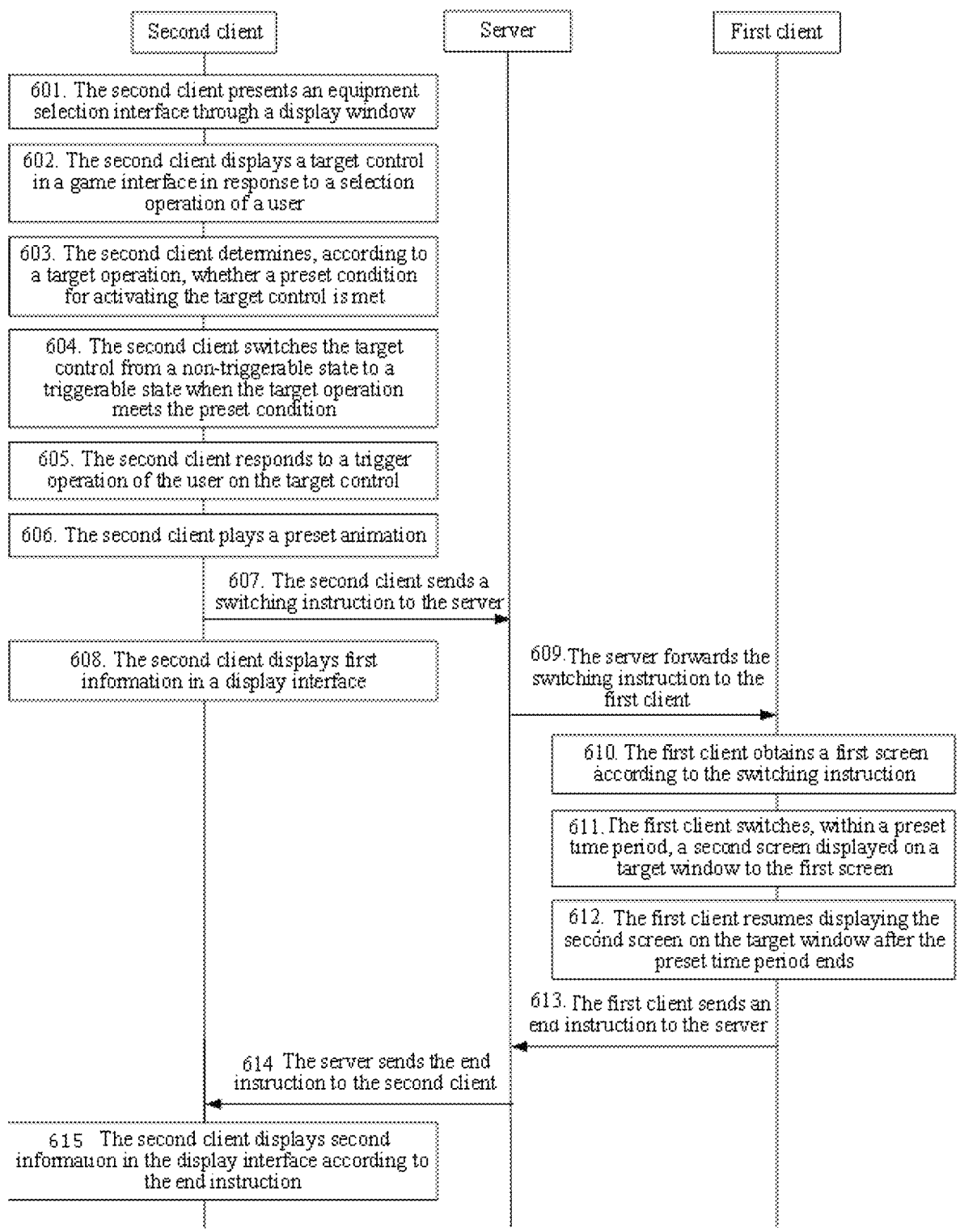
FIG. 6 is a schematic diagram of another embodiment of a screen switching method according to an embodiment of this application.

Referring to FIG. 6, a screen switching method provided in an embodiment of this application includes the following steps.

In step 601, a second client presents an equipment selection interface through a display window.

Figure 7:
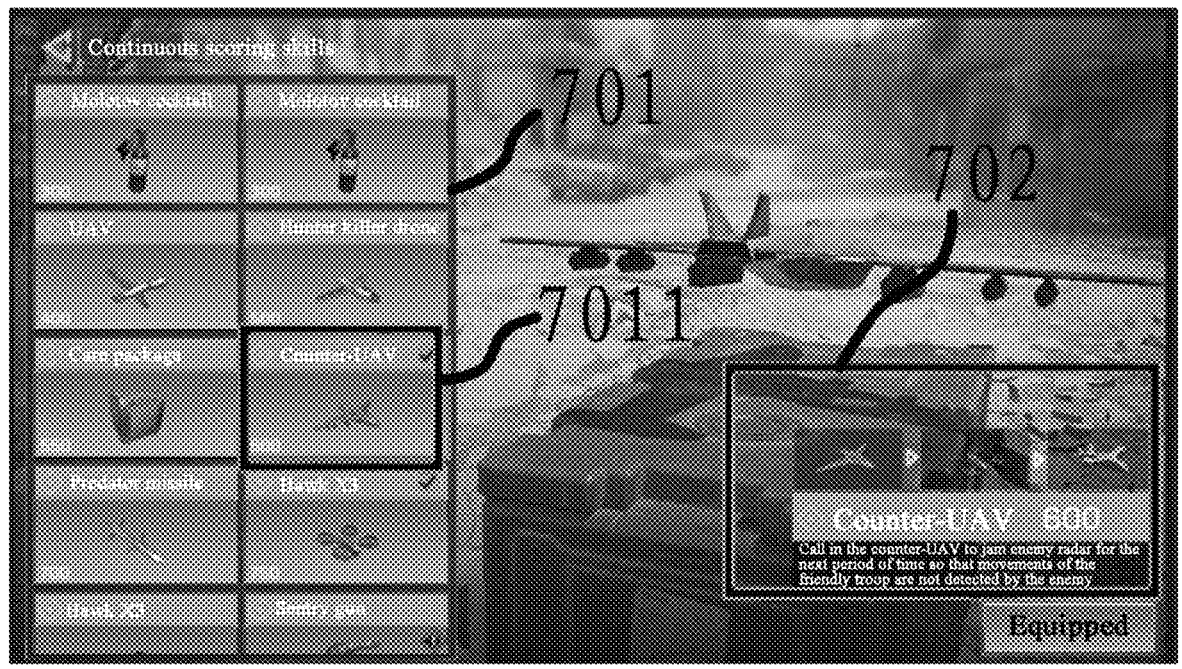
FIG. 7 is a diagram of a usage scenario of a screen switching method according to an embodiment of this application.

In this embodiment, the equipment selection interface is shown in FIG. 7. FIG. 7 shows an equipment selection interface before a user enters a game, and the user selects, through this interface, equipment that needs to be carried into the game. 701 is a selectable equipment bar in the equipment selection interface. "Counter-UAV" 7011 is a target control provided in this embodiment of this application. A mini-map displayed on a target window of an opponent is switched to a snowy screen by triggering the target control, to shield the opponent from obtaining game map information, thereby achieving an "anti-reconnaissance" effect.

In step 602, the second client displays a target control in a game interface in response to a selection operation of a user.

Figure 8:
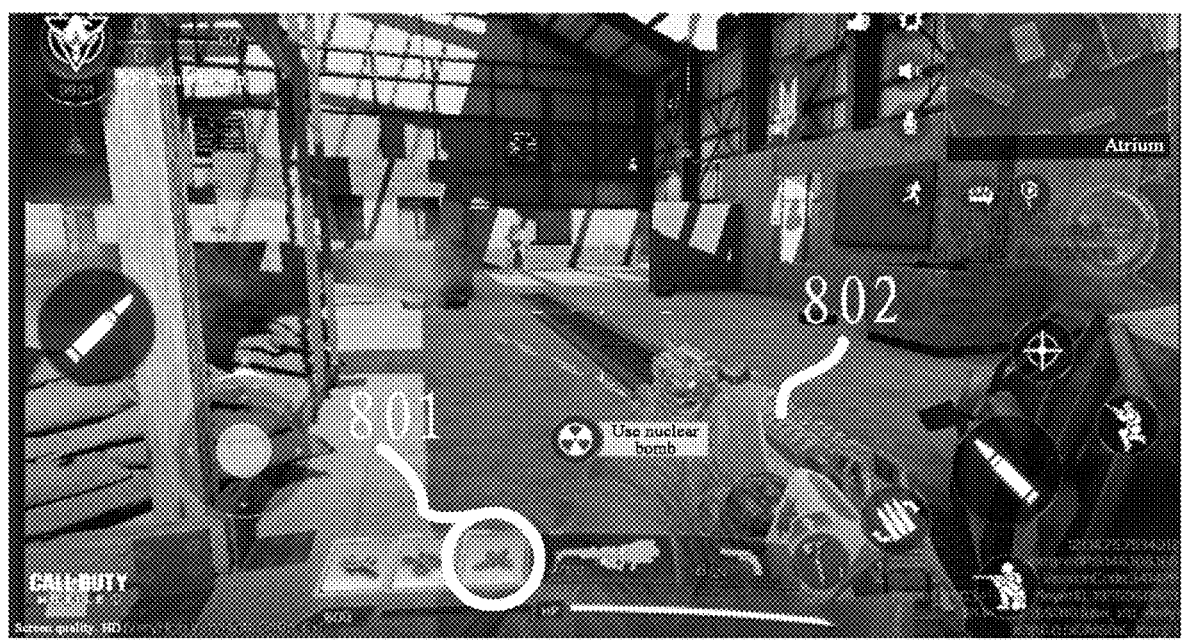
FIG. 8 is a diagram of a usage scenario of a screen switching method according to an embodiment of this application.

In this embodiment, the user selects, through the selection operation, the "counter-UAV" as equipment to be carried in the current round of the game, and then can see the equipment that has been selected as the current-round equipment in an equipment bar 702 in FIG. 7. In this case, after the user enters the game interface, the equipment "counter-UAV" is displayed as the target control in an operation interface of the user. Referring to FIG. 8, as shown in FIG. 8, in the game interface, a target control 801 displayed in a skill operation bar, namely, the operation interface, is a control corresponding to the equipment "counter-UAV". The screen switching method provided in this embodiment of this application can be performed by triggering the target control.

For specific implementations of the foregoing steps 601 and 602, refer to the foregoing steps 401 to 404. Details are not described herein again.

In step 603, the second client determines, according to a target operation, whether a preset condition for activating the target control is met.

In this embodiment, activating the target control is switching the target control from a non-triggerable state to a triggerable state. As shown in FIG. 8, at the beginning of the game, a display color of the target control 801 is gray, so as to inform the user that the target control cannot be clicked currently. That is, a function corresponding to the equipment "counter-UAV" cannot be called. When the target operation of the user meets the preset condition, for example, a quantity of opponents killed reaches a preset value, it is determined that the preset condition is reached.

In step 604, the second client switches the target control from a non-triggerable state to a triggerable state when the target operation meets the preset condition.

In this embodiment, as shown in FIG. 8, when the target operation meets the preset condition, the display color of the target control 801 changes from gray to yellow and is highlighted to prompt the user that the target control can be triggered currently.

For specific implementations of the foregoing steps 603 and 604, refer to the foregoing steps 301 and 302. Details are not described herein again.

In step 605, the second client responds to a trigger operation of the user on the target control.

In this embodiment, when the user triggers the target control during the game, the second client responds to the trigger operation.

In step 606, the second client plays a preset animation.

Figure 9:
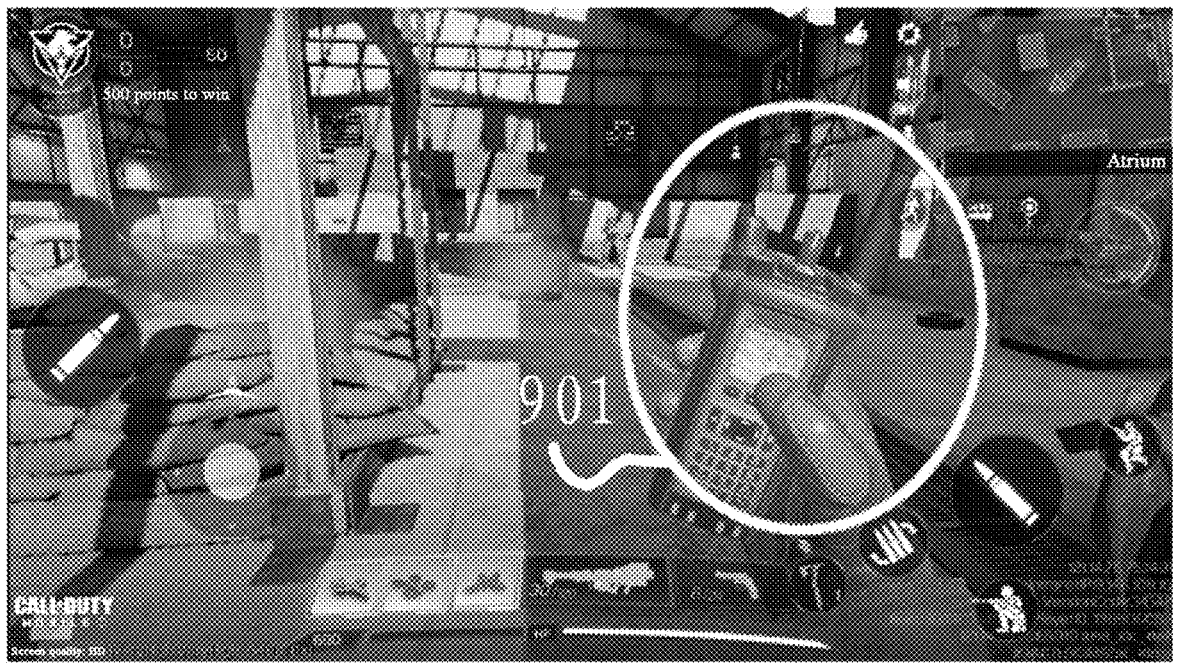
FIG. 9 is a diagram of a usage scenario of a screen switching method according to an embodiment of this application.

In this embodiment, when the user triggers the target control, the second client plays a preset animation in a display interface. The preset animation is used for informing the user that the operation corresponding to the target control is triggered currently. An animation effect of the preset animation may be shown in FIG. 8 and FIG. 9. The user controls the equipment held by the game character to switch from a gun 802 in FIG. 8 to an instruction input device 901 in FIG. 9. Subsequently, an animation of the game character entering an instruction in a digital keyboard of the instruction input device 901 is shown, to simulate an effect of the game character calling the counter-UAV through the instruction input device in the game.

In step 607, the second client sends a switching instruction to a server.

In this embodiment, during or after the playing of the preset animation, the second client sends the switching instruction to the server, to trigger the screen switching method provided in this embodiment of this application.

In step 608, the second client displays first information in a display interface.

Figure 10:
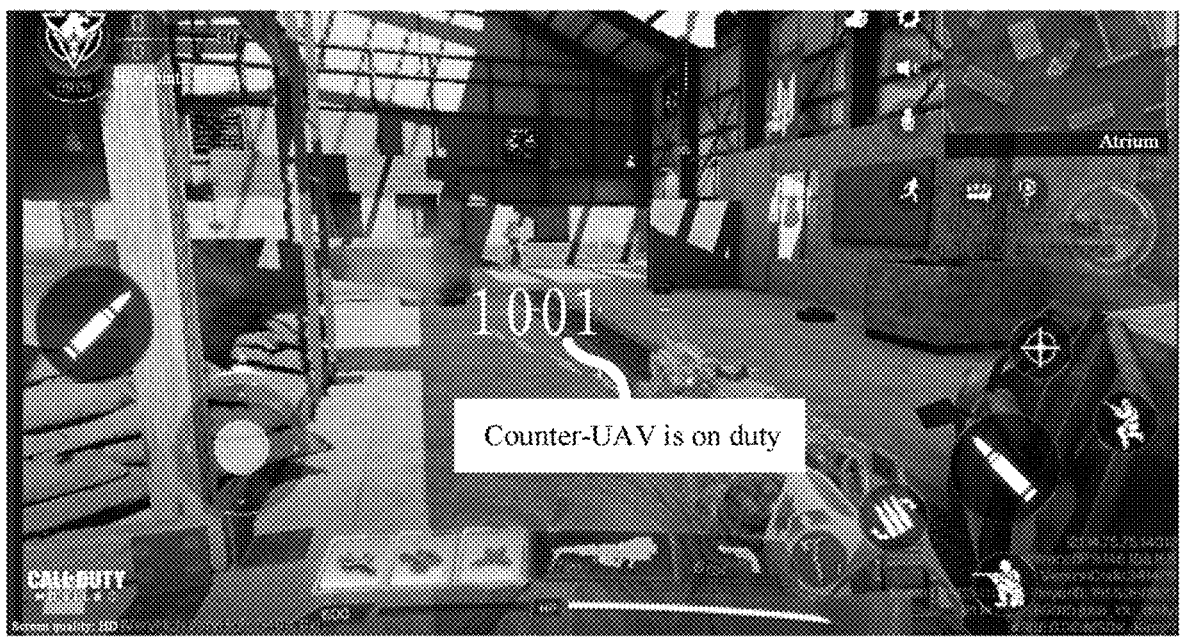
FIG. 10 is a diagram of a usage scenario of a screen switching method according to an embodiment of this application.

In this embodiment, for a specific implementation of step 608, reference may be made to the foregoing step 509, which is not described herein again. The first information is displayed in a manner shown in FIG. 10. First information "Counter-UAV is on duty" is displayed in an information prompt bar 1001, so that the user of the second client learns that skills provided by the equipment "counter-UAV" are in effect currently, and information about the mini-map in the target window of the opponent is shielded.

In step 609, the server forwards the switching instruction to a first client.

In this embodiment, for the operation of forwarding the switching instruction by the server, reference may be made to the foregoing steps 204 and 205, which are not described herein again.

In step 610, the first client obtains a first screen according to the switching instruction.

Figure 11:
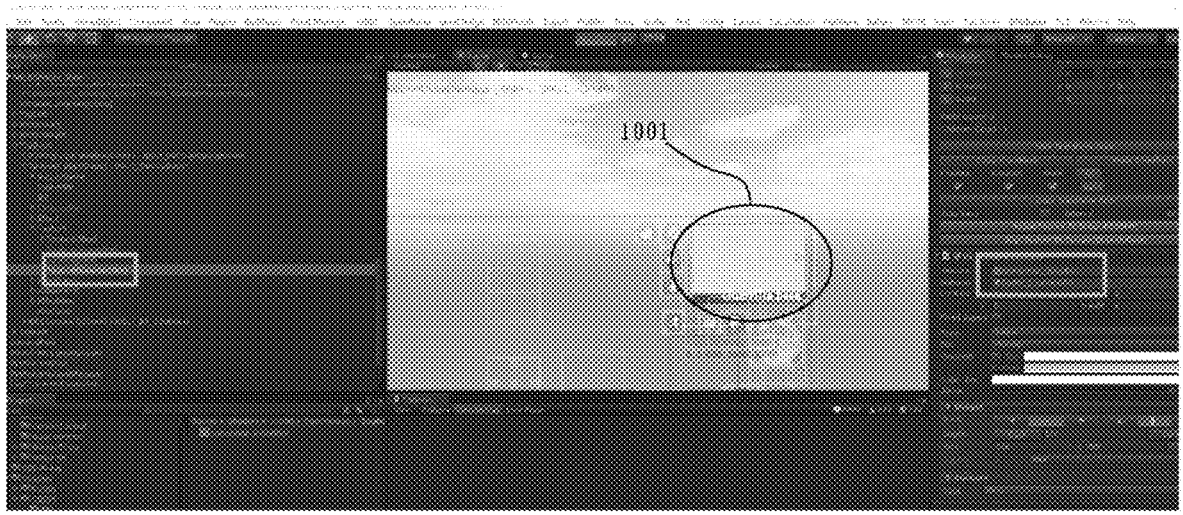
FIG. 11 is a diagram of a usage scenario of a screen switching method according to an embodiment of this application.

In this embodiment, for a specific implementation of step 610, reference may be made to the foregoing step 206, which is not described herein again. In a specific implementation, as shown in FIG. 11, a game developer pre-stores a "snowy screen" 1101 as the first screen in the first client during game development. The first client can obtain the first screen through the switching instruction.

In step 611, the first client switches, within a preset time period, a second screen displayed on a target window to the first screen.

Figure 12:
FIG. 12 is a diagram of a usage scenario of a screen switching method according to an embodiment of this application.
Figure 13:
FIG. 13 is a diagram of a usage scenario of a screen switching method according to an embodiment of this application.

In this embodiment, for a specific implementation of step 611, reference may be made to the foregoing step 513, which is not described herein again. In a specific implementation, switching of a display screen on the target window is shown in FIG. 12 and FIG. 13. As shown in FIG. 12, during the game, the first client displays a target window 1201, the target window 1201 being used for displaying map information of the game and coordinate information of a game character, so that the player of the first client can learn of the game information through the mini-map displayed on the target window, thereby achieving a preset radar effect in the game. Upon receipt of the switching instruction, the first client switches a screen displayed on the target window 1201 from the second screen, namely, the "mini-map", to the first screen, namely, the "snowy screen", to learn of a game screen shown in FIG. 13. In FIG. 13, a target window 1301 no longer displays the mini-map, but the snowy screen where no information can be seen, thereby achieving an effect of interference from the counter-UAV to radar reconnaissance of the user in the game.

In step 612, the first client resumes displaying the second screen on the target window after the preset time period ends.

In this embodiment, after the preset time period ends, the display of the target window in the first client is switched from the effect in FIG. 13 back to the effect in FIG. 12, so that the user of the first client can see the mini-map through the target window 1201 again and learn of the game information. For a specific implementation of the current step 611, refer to the foregoing step 514. Details are not described herein again.

In step 613, the first client sends an end instruction to the server.

In step 614, the server sends the end instruction to the second client.

In this embodiment, for specific implementations of steps 612 and 613, reference may be made to the foregoing steps 515 to 516. Details are not described herein again.

In step 615, the second client displays second information in the display interface according to the end instruction.

Figure 14:
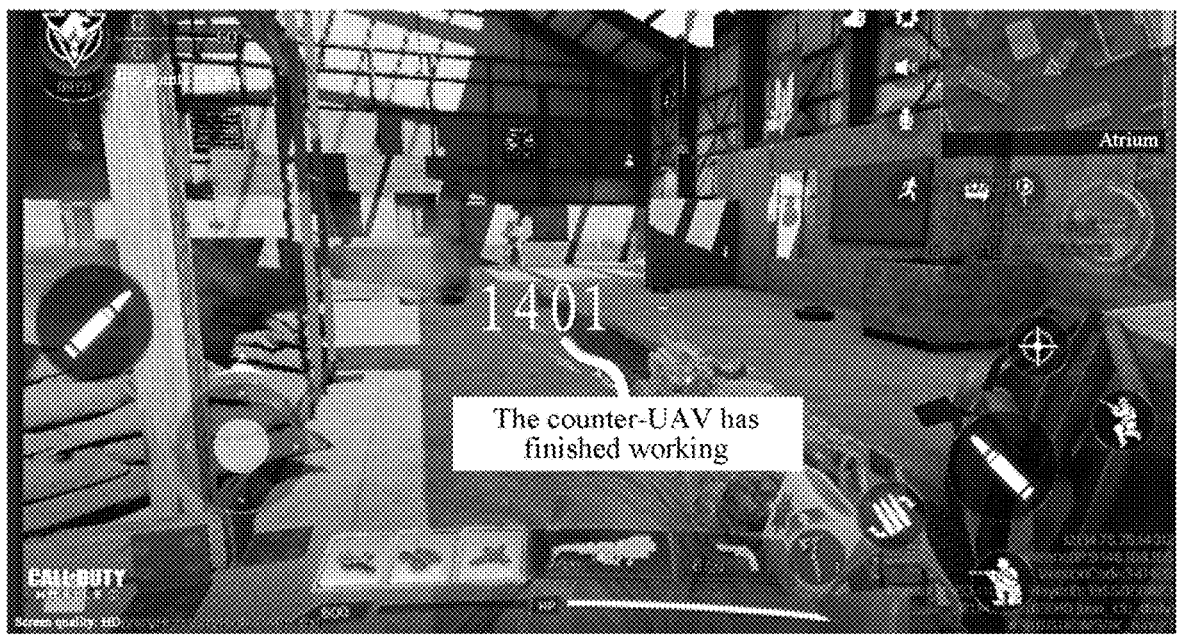
FIG. 14 is a diagram of a usage scenario of a screen switching method according to an embodiment of this application.

In this embodiment, as shown in FIG. 14, upon receipt of the end instruction, the second client displays, in the display interface through an information prompt bar 1401, second information: "The counter-UAV has finished working", so that the user of the second client learns that screen switching in the first client has ended. For a specific implementation of the current step 614, refer to the foregoing step 517. Details are not described herein again.

In this embodiment, through the foregoing steps 601 to 614, the second client is enabled to switch content displayed on the target window of the first client allowing a player of one party to limit content of information displayed on a target window of a player of the other party through an operation, and when a player of one party can obtain more map information through a reconnaissance operation, a player of the other party can reversely reduce, by using the method provided in this embodiment of this application, map information obtained by the opponent, thereby achieving balancing of the game mechanism and allowing one client to intervene in the display effect of the other client.

A screen switching method provided in an embodiment of this application includes: obtaining, by a first client, a switching instruction, the switching instruction being generated by a client other than the first client, such as a second client, and the switching instruction being used for instructing screen switching; obtaining, by the first client, a first screen according to the switching instruction, the first screen being a preset screen; and switching, by the first client, a second screen displayed on a target window to the first screen, the target window being a display window in a display interface of the first client, and the first screen and a second screen being different screens. The second client obtains a switching instruction generated according to a trigger operation of a user, and a server sends the switching instruction to the first client, so that the first client can switch a display screen in a target window according to the switching instruction, allowing one client to control switching of a display screen on a target window of another client.

The solutions provided in the embodiments of this application are described above. It may be understood that, to implement the foregoing functions, a computer device includes a corresponding hardware structure and/or a software module that executes each function. A person skilled in the art should be easily aware that, in combination with the modules and algorithm steps of the examples described in the embodiments disclosed in this specification, this application can be implemented by hardware (processing circuitry) or a combination of hardware and computer software (non-transitory computer-readable storage medium storing instructions). Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

Described in terms of hardware structure, the foregoing methods may be performed by one physical device, or may be jointly implemented by a plurality of physical devices, or may be performed by a logic function module in a physical device, this is not specifically limited in the embodiments of this application.

Figure 15:
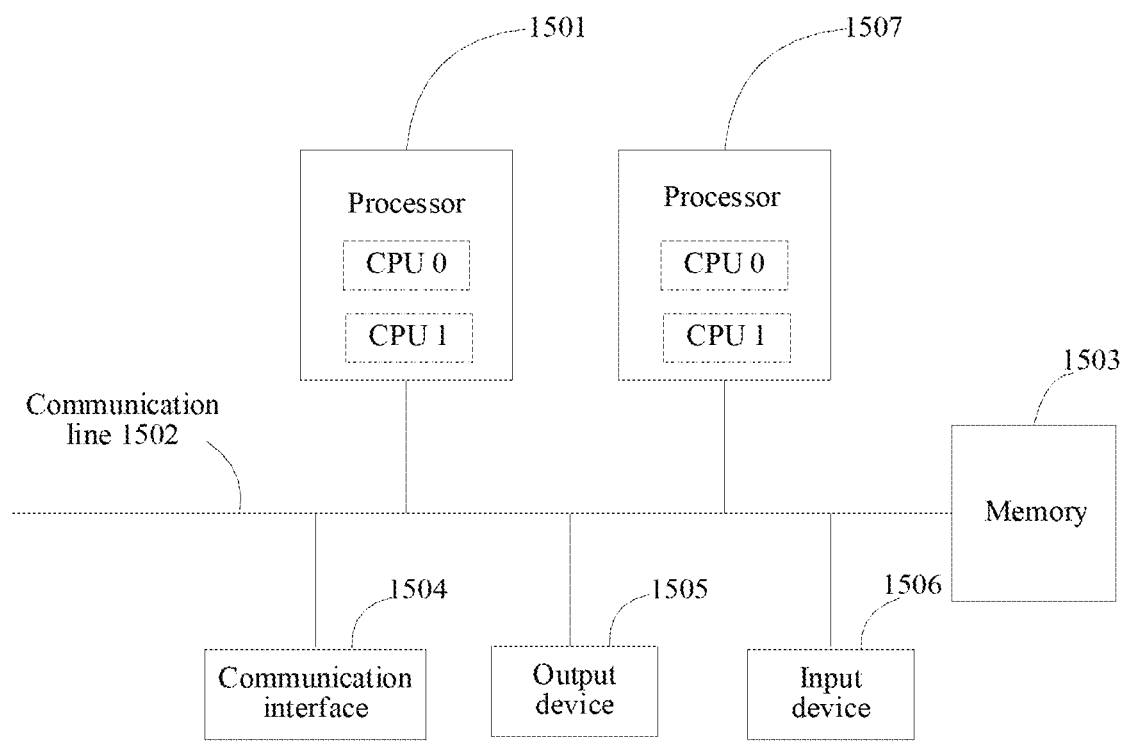
FIG. 15 is a schematic diagram of a computer device according to an embodiment of this application.

For example, the methods may all be implemented by a computer device in FIG. 15. FIG. 15 is a schematic diagram of a hardware structure of a computer device according to an embodiment of this application. A computer device includes at least one processor 1501 (processing circuitry), a communication line 1502, a memory 1503 (non-transitory computer-readable storage medium), and at least one communication interface 1504.

The processor 1501 may be a general-purpose central processing unit (CPU), a microprocessor, an application-specific integrated circuit (ASIC, for example, a server IC), or one or more integrated circuits configured to control execution of a program in the solutions of this application.

The communication line 1502 may include a channel, to transmit information between the foregoing components.

The communication interface 1504 is applicable to any transceiver-type apparatus, and is configured to communicate with another device or a communications network such as Ethernet, a radio access network (RAN), or a wireless local area network (WLAN).

The memory 1503 may be a read-only memory (ROM) or another type of static storage device that can store static information and a static instruction, or a random access memory (RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible to a computer, but is not limited thereto. The memory may independently exist and may be connected to the processor by using the communication line 1502. Alternatively, the memory may be integrated with the processor.

The memory 1503 is configured to store computer execution instructions for executing the solutions of this application, and the processor 1501 controls execution. The processor 1501 is configured to execute the computer execution instructions stored in the memory 1503 to implement the method provided in the foregoing embodiment of this application.

The computer execution instructions in this embodiment of this application may also be referred to as application code. This is not specifically limited in this embodiment of this application.

During specific implementation, in an embodiment, the processor 1501 may include one or more CPUs, for example, a CPU 0 and a CPU 1 in FIG. 15.

During specific implementation, in an embodiment, the computer device may include a plurality of processors, for example, a processor 1501 and a processor 1507 in FIG. 15. Each of these processors may be a single-core (single-CPU) processor, or may be a multi-core (multi-CPU) processor. The processor herein may be one or more devices or circuits, and/or a processing core configured to process data (for example, a computer program instruction).

During specific implementation, in an embodiment, the computer device may further include an output device 1505 and an input device 1506. The output device 1505 communicates with the processor 1501, and may display information in a plurality of manners. For example, the output device 1505 may be a liquid crystal display (LCD), a light emitting diode (LED) display device, a cathode ray tube (CRT) display device, a projector, or the like. The input device 1506 communicates with the processor 1501, and may receive an input by a user in a plurality of manners. For example, the input device 1506 may be a mouse, a keyboard, a touchscreen device, a sensing device, or the like.

The computer device may be a general-purpose device or a dedicated device. During specific implementation, the computer device may be a desktop computer, a portable computer, a network server, a palmtop computer (PDA), a mobile phone, a tablet computer, a wireless terminal device, an embedded device, or a device having a structure similar to that in FIG. 15. This embodiment of this application does not limit a type of the computer device.

In this embodiment of this application, functional units of the storage device may be divided based on the foregoing method examples. For example, the functional units may be divided in such a way that each functional unit corresponds to a specific function, or two or more functions may be integrated into one processing unit. The integrated unit may be implemented in a form of hardware, or may be implemented in a form of a software function unit. In this embodiment of this application, the unit division is an example, and is merely logical function division, and there may be other division manners during actual application.

Figure 16:
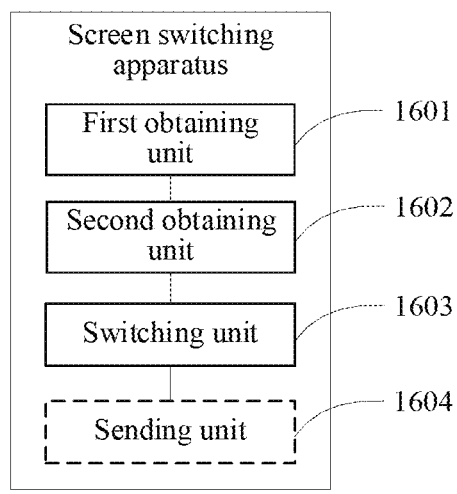
FIG. 16 is a schematic diagram of a screen switching apparatus according to an embodiment of this application.

For example, in the case of dividing each functional unit in an integrated manner, FIG. 16 is a schematic diagram of a screen switching apparatus.

As shown in FIG. 16, the screen switching apparatus provided in this embodiment of this application includes: a first obtaining unit 1601, the first obtaining unit 1601 being configured to obtain a switching instruction, the switching instruction being generated by a second client, a first client and the second client being different clients, and the switching instruction being used for instructing screen switching; a second obtaining unit 1602, the second obtaining unit 1602 being configured to obtain a first screen according to the switching instruction obtained by the first obtaining unit 1601, the first screen being a preset screen; and a switching unit 1603, the switching unit 1603 being configured to switch a second screen displayed on a target window to the first screen obtained by the second obtaining unit 1602, the target window being a display window in a display interface of the first client, and the first screen and the second screen being different screens.

In a possible implementation, the switching unit 1603 is further configured to: switch the second screen displayed on the target window to the first screen within a preset time period; and resume displaying the second screen on the target window of the first client after the preset time period ends.

The apparatus further includes a sending unit 1604, the sending unit 1604 being configured to: send an end instruction to a server, the end instruction being used for notifying the second client that the display of the first screen has ended.

In a possible implementation, the second screen is used for displaying running information of the first client, and the first screen is used for shielding the running information of the first client.

Figure 17:
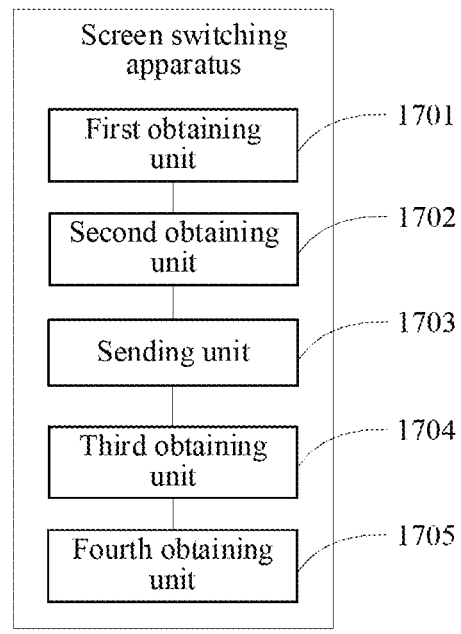
FIG. 17 is a schematic diagram of a screen switching apparatus according to an embodiment of this application.

As shown in FIG. 17, the screen switching apparatus provided in this embodiment of this application includes: a first obtaining unit 1701, the first obtaining unit 1701 being configured to obtain a switching instruction, and the switching instruction being used for instructing screen switching;

a second obtaining unit 1702, the second obtaining unit 1702 being configured to obtain a first client according to the switching instruction obtained by the first obtaining unit 1701, the first client and a second client being different clients, and the second client being a client that generates the switching instruction; and a sending unit 1703, the sending unit 1703 being configured to send the switching instruction to the first client obtained by the second obtaining unit 1702, so that the first client switches, according to the switching instruction, a second screen displayed on a target window to a first screen, the target window being a display window in a display interface of the first client, and the first screen and the second screen being different screens.

In a possible implementation, the apparatus further includes a third obtaining unit 1704, the third obtaining unit 1704 being configured to: obtain a first request, the first request being a request generated by the second client in response to a local operation; and the sending unit 1703 being further configured to: assign a first permission to the second client according to the first request, so that the second client displays a target control in a display interface according to the first permission, the target control being used for generating the switching instruction.

In a possible implementation, the apparatus further includes a fourth obtaining unit 1705, the fourth obtaining unit 1705 being configured to: obtain an end instruction transmitted by the first client, the end instruction being used for notifying the second client that the display of the first screen has ended; and the sending unit 1703 being further configured to: send the end instruction to the second client.

Figure 18:
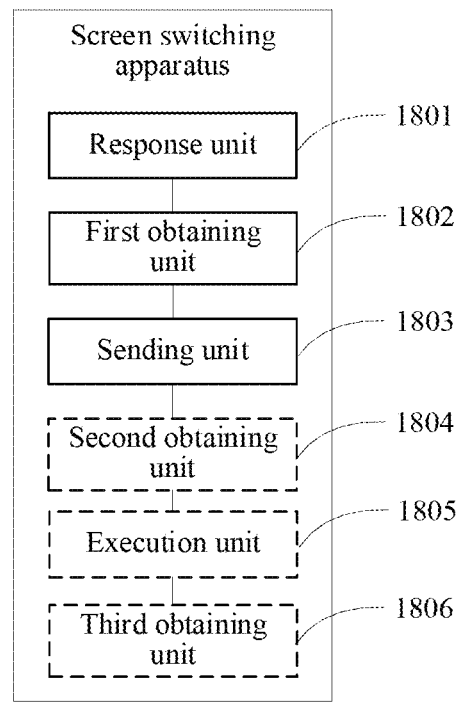
FIG. 18 is a schematic diagram of a screen switching apparatus according to an embodiment of this application.

As shown in FIG. 18, the screen switching apparatus provided in this embodiment of this application includes: a response unit 1801, the response unit 1801 being configured to respond to a trigger operation of a user on a target control, the target control being a control displayed in a display screen of a second client, and the target control being used for controlling screen switching on a target window of a first client; a first obtaining unit 1802, the first obtaining unit 1802 being configured to obtain a switching instruction according to the trigger operation responded by the response unit 1801, and the switching instruction being used for instructing screen switching; and a sending unit 1803, the sending unit 1803 being configured to send the switching instruction obtained by the first obtaining unit 1802 to a server, so that the server instructs, according to the switching instruction, the first client to switch a second screen displayed on the target window to a first screen, the target window being a display window in a display interface of the first client, the first screen and the second screen being different screens, and the first client and the second client being different clients.

In a possible implementation, the apparatus further includes a second obtaining unit 1804, the second obtaining unit 1804 being configured to: obtain a target operation, the target operation being an operation input by the user into the second client; and the apparatus further includes an execution unit 1805, the execution unit 1805 being configured to: switch the target control from a non-triggerable state to a triggerable state in a case that the target operation obtained by the second obtaining unit 1804 meets a preset condition.

In a possible implementation, the apparatus further includes a third obtaining unit 1806, the third obtaining unit 1806 being configured to: obtain a first request, the first request being used for requesting to display the target control on the second client; the sending unit 1803 being further configured to: send the first request to the server; the third obtaining unit 1806 being further configured to: obtain a first permission assigned by the server; and the execution unit 1805 being further configured to: display the target control in the display screen according to the first permission.

In a possible implementation, the execution unit 1805 is further configured to: display first information in a display interface, the first information being used for indicating that a screen displayed on the target window of the first client is the first screen; obtain an end instruction sent by the server, the end instruction being used for notifying the second client that the display of the first screen has ended; and display second information in the display interface according to the end instruction, the second information being used for indicating that a screen displayed on the target window of the first client is the second screen.

An embodiment of this application further provides a computer storage medium, including instruction, the instructions, when run on a computer device, causing the computer device to perform the foregoing method.

An embodiment of this application further provides a computer program product, the computer program product, when executed, being configured to perform the foregoing method.

For the detailed description of a program stored in a computer storage medium provided in an embodiment of this application, refer to the foregoing embodiment. Details are not described herein again.

The embodiments in this specification are all described in a progressive manner. Description of each of the embodiments focuses on differences from other embodiments, and reference may be made to each other for the same or similar parts among the embodiments. The apparatus embodiments basically correspond to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

In combination with the embodiments disclosed herein, steps of the method or algorithm described may be directly implemented by using hardware, a software module executed by a processor, or the combination thereof. The software module may be placed in a RAM, a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The foregoing description of the disclosed embodiments enables a person skilled in the art to implement or use this application. Various modifications to the embodiments are obvious to the person skilled in the art, and general principles defined in this specification may be implemented in other embodiments without departing from the spirit or scope of this application. Therefore, this application is not limited to these embodiments illustrated herein, but needs to conform to the broadest scope consistent with the principles and novel features disclosed herein.

What is claimed is:

1. A method for a multi-player video game, the method comprising:
displaying, by processing circuitry of a second client, an equipment selection interface including an anti-reconnaissance function;
receiving, by the processing circuitry, a user selection of the anti-reconnaissance function on the displayed equipment selection interface;
in response to receiving the user selection of the anti-reconnaissance function, transmitting, by the processing circuitry, a switching instruction to a server that forwards the switching instruction to a first client corresponding to an opposing player, the switching instruction instructing a reconnaissance information screen of the opposing player to be switched to a blocking screen without reconnaissance information;
receiving, by the processing circuitry from the server, an end switching instruction that is sent by the server in response to receiving the end switching instruction from the first client when the first client determines that the blocking screen is to be switched to the reconnaissance information screen, the end switching instruction indicating an end of the switching of the reconnaissance information screen to the blocking screen on the first client and indicating that the reconnaissance information screen is now displayed by the first client; and
in response to the end switching instruction being received from the server, displaying a message by the processing circuitry of the second client that indicates the anti-reconnaissance function has ended.

2. The method according to claim 1, wherein the reconnaissance information screen of the opposing player displays the reconnaissance information gathered through a reconnaissance aircraft function deployed by the opposing player.

3. The method according to claim 1, wherein
the reconnaissance information screen is a map screen showing map information of the multi-player video game gathered through a reconnaissance function of the opposing player, including location information of at least one game character, and
the blocking screen is a snow screen that blocks the map screen from being displayed.

4. The method according to claim 1, wherein the displaying the equipment selection interface further includes:
initially displaying, by the processing circuitry, the anti-reconnaissance function in the equipment selection interface in a non-triggerable state that does not allow the user selection of the anti-reconnaissance function;
determining, by the processing circuitry, whether a game play condition has been met in the second client; and
in response to a determination that the game play condition has been met in the second client, changing, by the processing circuitry, the anti-reconnaissance function in the equipment selection interface to be displayed in a triggerable state that allows the user selection of the anti-reconnaissance function.

5. The method according to claim 4, wherein the game play condition is defined by a preset quantity of opponents killed, such that the determining whether the game play condition has been met includes determining whether the preset quantity of opponents has been killed by the second client.

6. The method according to claim 1, further comprising, after the receiving the user selection, displaying, by the processing circuitry, prompt information in the second client indicating that the reconnaissance information screen of the first client is currently switched to the blocking screen.

7. A method for a multi-player video game, the method comprising:
receiving, by processing circuitry of a server from a second client, a switching instruction, the switching instruction instructing a reconnaissance information screen of an opposing player to be switched to a blocking screen without reconnaissance information;
identifying, by the processing circuitry, a first client corresponding to the opposing player of the second client;
transmitting, by the processing circuitry to the identified first client, the switching instruction instructing the reconnaissance information screen of the first client to be switched to the blocking screen;
receiving, by the processing circuitry from the first client, an end switching instruction indicating that switching of the reconnaissance information screen to the blocking screen of the first client has ended and that the reconnaissance information screen is now displayed by the first client, wherein the end switching instruction is sent by the first client when the first client determines that the blocking screen is to be switched to the reconnaissance information screen; and
transmitting, by the processing circuitry to the second client, the end switching instruction, wherein the end switching instruction causes the second client to display a message indicating that an anti-reconnaissance function has ended.

8. The method according to claim 7, wherein the reconnaissance information screen of the opposing player displays the reconnaissance information gathered through a reconnaissance aircraft function deployed by the opposing player.

9. The method according to claim 7, wherein
the reconnaissance information screen is a map screen showing map information of the multi-player video game gathered through a reconnaissance function of the opposing player, including location information of at least one game character, and
the blocking screen is a snow screen that blocks the map screen from being displayed.

10. The method according to claim 7, wherein the switching instruction transmitted to the identified first client causes the first client to replace the reconnaissance information screen displayed by the first client with the blocking screen for a preset time period and to resume displaying the reconnaissance information screen when the preset time period ends.

11. The method according to claim 10, wherein the reconnaissance information screen is displayed by the first client in a display window and the switching instruction transmitted to the identified first client causes the display window to display the blocking screen instead of the reconnaissance information screen during the preset time period.

12. An apparatus comprising:
processing circuitry of a second client in a multi-player video game, the processing circuitry configured to
display an equipment selection interface including an anti-reconnaissance function;
receive a user selection of the anti-reconnaissance function on the displayed equipment selection interface;

in response to receiving the user selection of the anti-reconnaissance function, transmit a switching instruction to a server that forwards the switching instruction to a first client corresponding to an opposing player, the switching instruction instructing a reconnaissance information screen of the opposing player to be switched to a blocking screen without reconnaissance information;

receive an end switching instruction that is sent by the server in response to receiving the end switching instruction from the first client when the first client determines that the blocking screen is to be switched to the reconnaissance information screen, the end switching instruction indicating an end of the switching of the reconnaissance information screen to the blocking screen on the first client and indicating that the reconnaissance information screen is now displayed by the first client; and in response to the end switching instruction being received from the server, display a message of the second client that indicates the anti-reconnaissance function has ended.

13. The apparatus according to claim 12, wherein the reconnaissance information screen of the opposing player displays the reconnaissance information gathered through a reconnaissance aircraft function deployed by the opposing player.

14. The apparatus according to claim 12, wherein
the reconnaissance information screen is a map screen showing map information of the multi-player video game gathered through a reconnaissance function of the opposing player, including location information of at least one game character, and
the blocking screen is a snow screen that blocks the map screen from being displayed.

15. The apparatus according to claim 12, wherein the processing circuitry is further configured to:
initially display the anti-reconnaissance function in the equipment selection interface in a non-triggerable state that does not allow the user selection of the anti-reconnaissance function;
determine whether a game play condition has been met in the second client; and
in response to a determination that the game play condition has been met in the second client, change the anti-reconnaissance function in the equipment selection interface to be displayed in a triggerable state that allows the user selection of the anti-reconnaissance function.

16. The apparatus according to claim 15, wherein the game play condition is defined by a preset quantity of opponents killed, such that the determining whether the game play condition has been met includes determining whether the preset quantity of opponents has been killed by the second client.

17. The apparatus according to claim 12, wherein the processing circuitry is further configured to, after the user selection is received, display prompt information in the second client indicating that the reconnaissance information screen of the first client is currently switched to the blocking screen.

* * * * *